(No Model.) 2 Sheets—Sheet 1.

E. M. KELLOGG.
MECHANICAL MOVEMENT.

No. 500,584. Patented July 4, 1893.

Witnesses
Fred'k H. Mills.
A. S. Wells.

Inventor
Edwin M. Kellogg.
By His Attorney
Joseph G. Parkinson

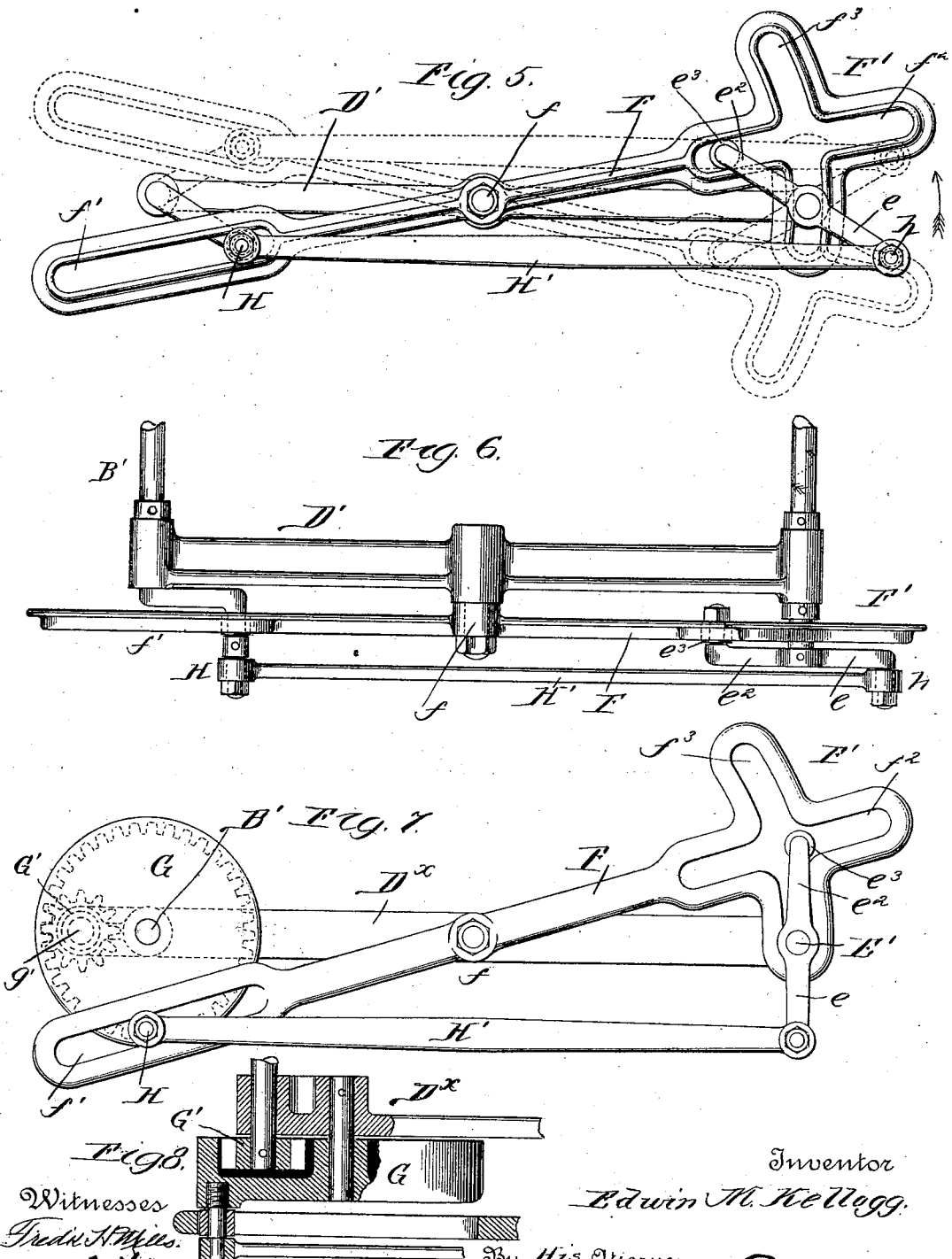

UNITED STATES PATENT OFFICE.

EDWIN M. KELLOGG, OF DELAVAN, WISCONSIN.

MECHANICAL MOVEMENT.

SPECIFICATION forming part of Letters Patent No. 500,584, dated July 4, 1893.

Application filed May 21, 1892. Serial No. 433,836. (No model.)

*To all whom it may concern:*

Be it known that I, EDWIN M. KELLOGG, a citizen of the United States, residing at Delavan, in the county of Walworth and State of Wisconsin, have invented certain new and useful Improvements in Mechanical Movements, of which the following is a specification.

My invention relates primarily to mechanical movements for use in bicycles to communicate motion from the treadle to the driving-wheel, and therefore I will illustrate it in connection with a "safety" bicycle, to which, when used for driving such vehicles, it is most applicable. It has, however, a more enlarged and extended scope and can be applied to machinery where it is desired to drive one shaft from another at a considerable distance from the driving-shaft. To this end I propose to employ a link or pitman to communicate motion from one shaft to another and a slotted lever to throw the dead center, under such arrangement of mechanism that the effective proportion of lever-arm and power-arm will never vary and also to employ intermediate gearing when desired to speed the driven shaft.

Figure 1:
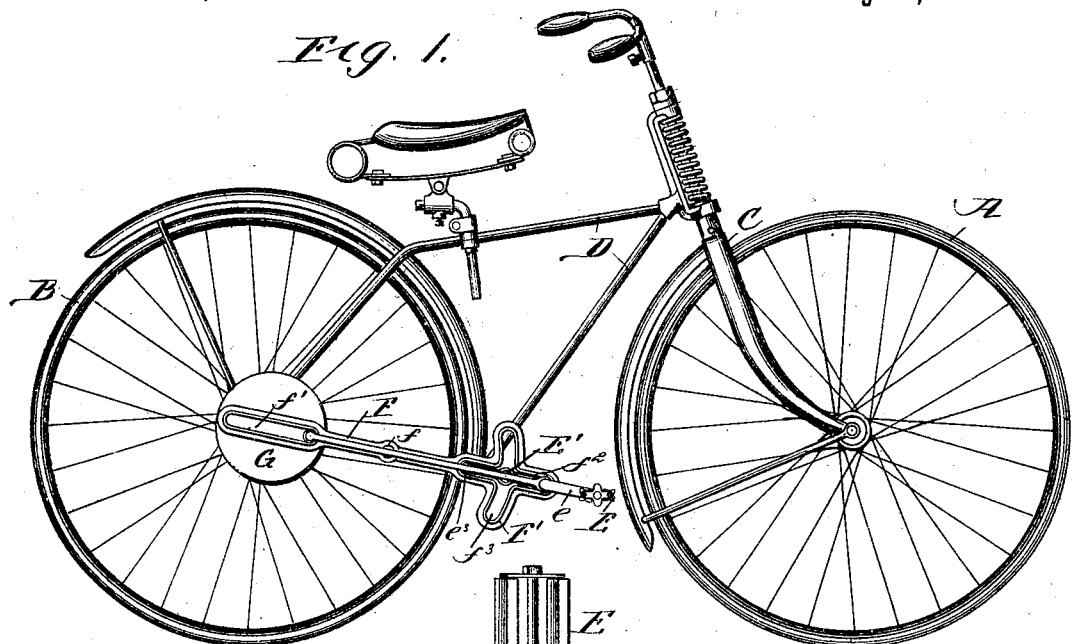
Figure 2:
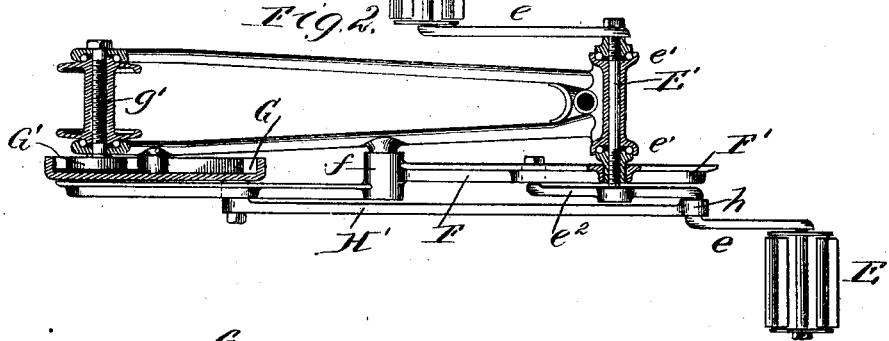
Figure 3:
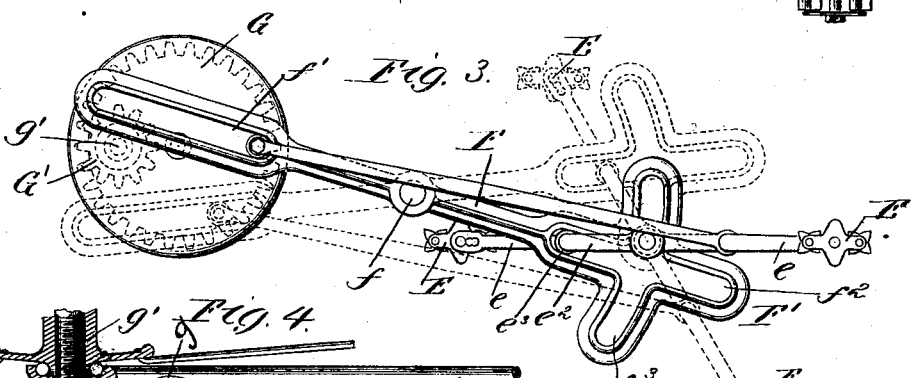
Figure 4:
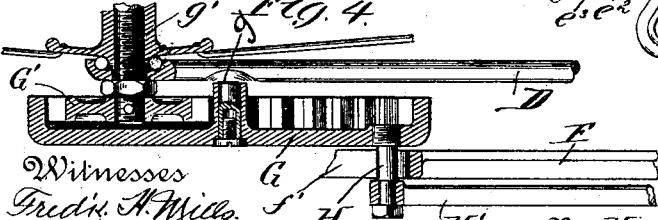

In the drawings: Figure 1 is a side elevation of a speeded "safety" bicycle employing my invention. Fig. 2 is a top-plan view, partly in section, the wheels being removed; Fig. 3, an enlarged detail in diagrammatic view; Fig. 4, an enlarged detail in horizontal section. Fig. 5 represents in side elevation and diagram, a modified form of said motion applied to shafting where it is not desired to reverse the direction of rotation of the driven shaft relative to the driving-shaft; Fig. 6, a top plan view of said modifications Fig. 7, a side elevation showing the invention applied to an engine or machine for the purpose of speeding the driven shaft in the same direction as the driving-shaft, and Fig. 8, a detail of the latter construction in top plan view partly broken away.

A represents the steering-wheel of a bicycle of the "safety" type, and B the driving-wheel.

C is the steering-fork and D the back-bone or frame, connected with the steering-fork by a sleeve. This back-bone may be of any desired construction and may represent, for the purposes of this description, the bench or frame of any machine.

Pedals, E, are mounted at the end of cranks, $e$, attached to a shaft, E', carried in bearings, $e'$, in this frame, in advance of the driving-wheel, and said shaft it will be understood may represent a driving-shaft in any machine and the pedals may represent the prime motor. One of the cranks has a heel extension constituting a second crank, $e^2$, with wrist-pin carrying by preference an anti-friction roll, $e^3$. Pivoted to the frame at $f$ is a lever, F, having at its rear end a long slot, $f'$, and at its front end a cross-shaped cam-slot, F', one reach, $f^2$, of which is coincident with the length of the lever or with the axis of the slot at the other end, while the other reach, $f^3$, is described on a radius concentric with the pivot of the lever. The curved reach of this cross-slot takes over the end of the crank-shaft and in the oscillations of the lever plays up and down thereover, as represented by diagrammatic lines in Fig. 3, while into the other or longitudinal reach plays the wrist-pin of the secondary crank, $e^2$, above referred to.

At the rear of the main-frame, on that side of the wheel on which the lever is pivoted, is journaled, as at $g$, an internal annular gear, G, preferably cup-shaped and closed on the outer side, if used in a bicycle, but not necessarily so in other mechanisms. This gear engages with a pinion, G', on the end of the axle, $g'$, of the driving-wheel, which axle will represent a transmission-shaft or driven shaft. A wrist-pin, H, from the outer face of the internal gear-wheel takes into the rear slot of the lever and plays back and forth therein in the revolution of the gear. This wrist-pin is connected by a link, H', with a bend or journal, $h$, on the treadle-arm, of the double-crank before alluded to. Said bend is equidistant from the wrist-pin on the other arm of said crank. Therefore, as the crank-shaft is revolved by means of treadles, the forward end of the lever is raised and lowered by the play of the wrist-pin of the double-crank in the longitudinal slot in the forward end of the lever and simultaneously therewith the rear end of the lever raises or forces down the wrist-pin on the annular gear and the link connection between said wrist-pin and the bend of the double-crank imparts rotary motion to said gear and through it to the pinion on the end of the driven shaft or axle of the driving wheel. By this means all dead centers are avoided.

In applying this invention to machinery in general, I am able to reverse the action of the driven shaft by making said shaft in effect the axis of the annular gear, dispensing with such gear, as a gear, and substituting for it a crank, which, in effect, represents the web of metal connecting the axle of the gear with the wrist-pin. Such a construction is shown in Figs. 5 and 6. The lever is shaped as heretofore described and the parts represented are lettered as heretofore, with the exception that the frame-bar, which is not now considered the back-bone of the bicycle, is lettered, D', to distinguish it from previous lettering. The shaft, B', it will be understood in this instance, may be the driven shaft represented in previous figures by hub, $g$ of annular gear G, and the action will be as before.

In Figs. 7 and 8 I have shown apparatus for operating two shafts of the engine or machine in like directions and speeding one from the other. This apparatus is similar to that illustrated in the first four figures and therefore is lettered similarly with this exception that as it is intended to drive the crank-shaft, E', from a stationary motor and thereby communicate motion to the shaft, $g'$, corresponding to the axle of the rear wheel of the bicycle illustrated in the first figure, the back bone or frame of the bicycle, lettered D, in said Fig. 1 is, in said Figs. 7 and 8, supplanted by a fixed bar, D, which represents the frame-bar or bench of the machine.

It will, of course, be understood that in the use of the word frame I have included all kinds of structures, such as mill buildings and engine frames, as my invention is quite as susceptible of communicating power from a line shaft in a factory to machines on the floor beneath as of communicating power to different parts of an engine of small dimensions.

What I claim as my invention is—

1. The combination, substantially as hereinbefore set forth, of the pivoted lever slotted longitudinally at one end and having cross-slots at the other end, a double-crank provided with a wrist-pin working in the longitudinal cross-slot, a driving-shaft over which the vertical (and curved) cross-slot takes, a shaft provided with crank and wrist-pin playing in the longitudinal slot at the opposite end and a link connecting the outer arm of the double crank with said wrist-pin.

2. The combination, substantially as hereinbefore set forth, of the pivoted lever having a longitudinal slot at one end and cross slots at the other end, a driving-shaft with double-crank, a double-crank from one arm of which a wrist-pin takes into the lingitudinal portion of the cross-slots, an internal annular gear having a wrist-pin taking into the longitudinal slot at the opposite end of the lever, a link connecting said wrist-pin with the outer arm of the double crank and a pinion on a shaft engaging with the annular gear and driven by the action of said lever and link.

3. The combination, substantially as hereinbefore set forth, of a pivoted lever having a longitudinal slot at one end and cross slots at the other end, one being longitudinal, a driving-shaft having treadles, one of said treadles being provided with a double crank, a wrist-pin from one arm of the double crank taking into the longitudinal slot of said lever at the cross end, an annular gear provided with a wrist pin which takes into the opposite longitudinal slot, a link connecting said wrist-pin with the outer wrist-pin or journal, of the double crank treadle, an axle and a pinion thereon engaging with the annular gear.

EDWIN M. KELLOGG.

Witnesses:
A. S. WELLS,
CHARLES L. HINE.